United States Patent [19]

Wadium et al.

[11] Patent Number: 5,244,532
[45] Date of Patent: Sep. 14, 1993

[54] ULTRASONIC ANVIL CARTRIDGE

[75] Inventors: Christopher S. Wadium, Salt Lake City; Robert G. Kelley, South Jordan, both of Utah

[73] Assignee: Stone Container Corporation, Chicago, Ill.

[21] Appl. No.: 945,220

[22] Filed: Sep. 15, 1992

[51] Int. Cl.$^5$ .................. B29C 65/08; B32B 31/00
[52] U.S. Cl. .................. 156/580.1; 156/73.1; 156/580.2; 425/174.2; 228/1.1
[58] Field of Search .................. 156/73.1, 73.4, 502, 156/580, 580.1, 580.2, 581; 425/174.2; 228/1.1, 5.5

[56] References Cited

U.S. PATENT DOCUMENTS 4,623,420 11/1986 Hinkley .................. 156/515
4,711,693 12/1987 Holze, Jr. .................. 156/580.1

Primary Examiner—David A. Simmons
Assistant Examiner—J. Sells
Attorney, Agent, or Firm—Dick and Harris

[57] ABSTRACT

An ultrasonic anvil cartridge for use in association with ultrasonic apparatuses for sealing at least two layers of ultrasonic reactive material. The ultrasonic anvil cartridge cooperates with an anvil housing and an ultrasonic wave generator towards maintaining a substantially even pressure across at least two layers of ultrasonic reactive material such that a substantially even and tight seal can be formed across at least two layers of ultrasonic reactive material. The ultrasonic anvil cartridge includes a plurality of substantially C-shaped support members which are operably and successively aligned so as to be positioned one adjacent another. This plurality of substantially C-shaped members is further encapsulated in substantially elastomeric encapsulating material which is operably positioned within the collective concave surface of the plurality of substantially C-shaped support members to form a unitary cartridge having a substantially convex exterior surface.

8 Claims, 1 Drawing Sheet

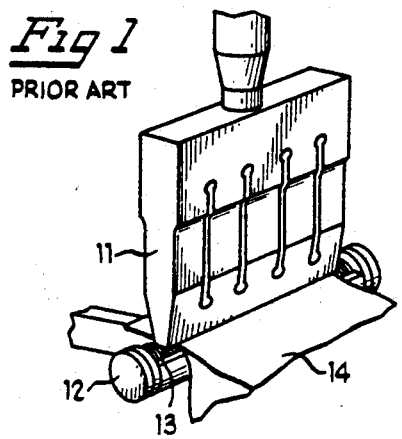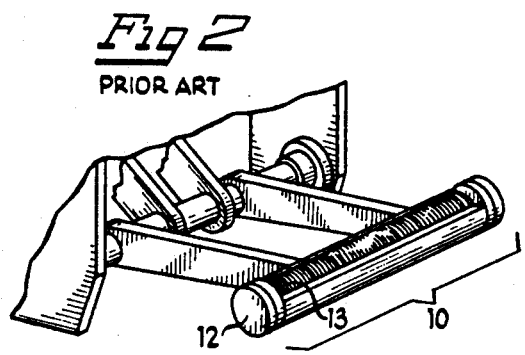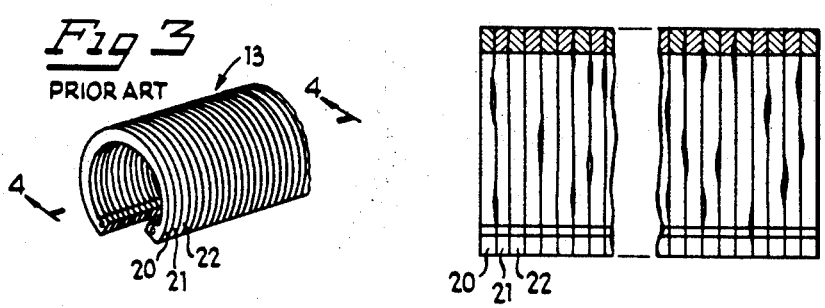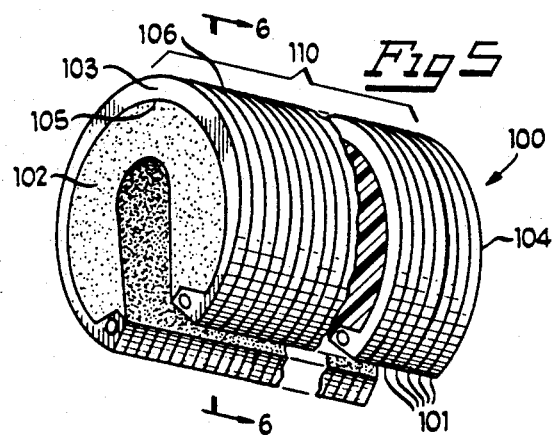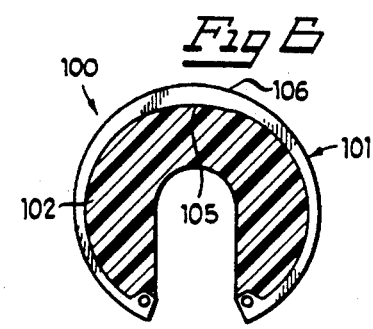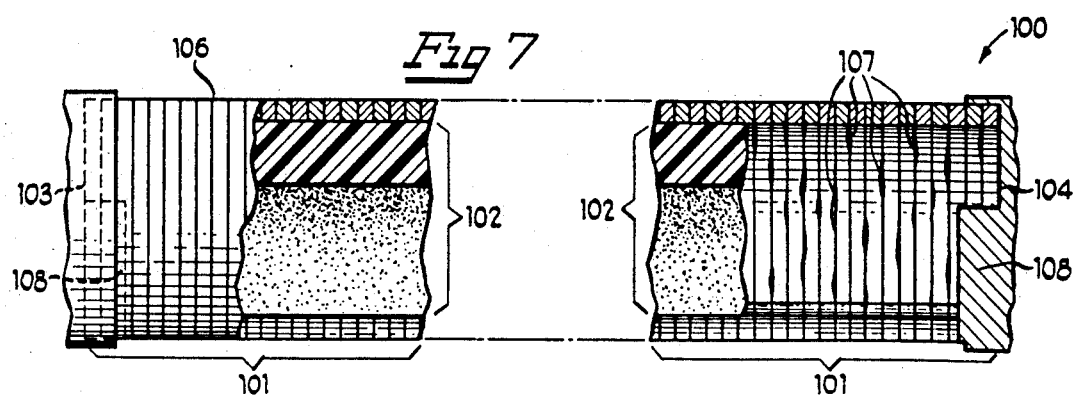

ULTRASONIC ANVIL CARTRIDGE

BACKGROUND OF THE INVENTION

The present invention relates in general to container sealing equipment and, in particular, to an ultrasonic anvil cartridge for use in association with ultrasonic apparatuses for sealing containers having two or more layers of ultrasonic reactive material. While ultrasonic sealing can be utilized in connection with the sealing of many containers wherein at least two layers of ultrasonic reactive material are sealed together, one significant application is associated with the sealing of multi-wall valve bags.

Multi-wall valve bags have been used in the packaging industry for a number of years. These bags are generally filled with food products, agricultural products or chemical products for which delivery directly from the bag to another container, such as a mixing vat, is facilitated through the use of an extended sleeve attached to a valve located on the bottom of the bag. The addition of the sleeve also allows product manufacturers to fill the bags through the sleeve. Because the bag is filled through the sleeve, the remainder of the bag is pre-sealed by the packaging supplier, thus closure of the bag is simplified. The consumer uses the bag by positioning it with the sleeve disposed over a working container into which the user desires the bagged product flow. The user then opens the sleeve by removing its sealed portion, allowing the contained product to flow out in an orderly manner through the remaining portion of the sleeve and into the working container.

Multi-wall paper valve bags always had the potential to leak through the extended sleeve after filling. This leakage was attributed mainly to the sealing method employed. Originally, the sleeves were sealed by hand by flattening and folding the extended sleeve and then folding it back underneath the sleeve into the pocket, which results from the addition of the sleeve to the bag. Hand sealing is not considered dependable because it is wholly dependent on the skill and conscientiousness of the person performing the folding and sealing operations.

An attempted solution to this leakage problem was to coat the inner surface of the extended sleeve with thermoplastic materials. After filling the bag, a heater bar was pressed firmly against the sleeve to flatten it and then reactivate the thermoplastic coating on the sleeve interior. However, due to the coating of dust that often forms in the sleeve during the filling process this method was also considered unreliable. Dust (or even solid contaminant) reduces the effectiveness of any heat seal formed by the reactivated thermoplastic, unless the thermoplastic material is thick enough to enshroud the contaminate.

Another approach to the contaminant problem and sealing multi-wall valve bags has been to use ultrasonic energy to reactivate the thermoplastic. While the initial purpose of the ultrasonic vibrations was to increase the kinetic energy of the thermoplastic to heat it, the vibrations also move the contamination away from the area being sealed, thus allowing a more perfect seal and fewer bag failures.

Current ultrasonic sealing devices consist of an ultrasonic horn, which emits ultrasonic vibrations and an anvil which contacts the extended sleeve of a container such that the anvil supports the container, so that the horn can contact and pinch the bag shut.

While, this approach to sealing has greatly improved results, some aspects of the sealing device require excessive maintenance, particularly the anvil. These anvils currently utilize commercially available internal "C" type snap rings like those used in systems transmitting and/or dissipating various forms of energy. Because the anvil comes into close proximity to the ultrasonic horn, the C-rings experience substantial vibration. The resulting wear on these rings often necessitates their replacement approximately every two weeks in a normal commercial packaging operation. This involves the removal and replacement of approximately 200 C-rings. Such maintenance involves a significant amount of labor intensive time.

It is thus an object of the present invention to provide a unitary ultrasonic anvil cartridge which can be removed and installed in a fraction of the time required to replace the approximately 200 "C" type snap rings used in the prior art devices.

It is another object of the present invention to increase the useful life of the ultrasonic anvil, by encapsulating substantially C-shaped members in an elastomeric material, thus reducing internal friction, thereby extending their useful life. It is an associated object of the present invention to reduce the noise levels associated with the ultrasonic horn vibrating the anvil through dampening of the substantially C-shaped members through the use of an encapsulating material.

It is still a further object of the present invention to provide ultrasonic sealing of a multi-wall valve bag equal to or better than the sealing achieved with several hundred separate "C" type snap rings.

These and other objects of the present invention will become apparent in light of the present specification, claims and drawings.

SUMMARY OF THE INVENTION

The present invention comprises an ultrasonic anvil cartridge for use in association with ultrasonic apparatuses for sealing at least two layers of ultrasonic reactive material. The ultrasonic anvil cartridge cooperates with an anvil housing towards maintaining a substantially even pressure across at least two layers of ultrasonic reactive coated material. The ultrasonic anvil cartridge and the anvil housing define a sealing region which is positioned relative to an ultrasonic wave generator such that at least two layers of ultrasonic reactive material are substantially compressed together between the ultrasonic wave generator and the ultrasonic anvil cartridge. The ultrasonic anvil cartridge comprises a plurality of substantially C-shaped support means, which are operably aligned so as to be adjacent to one another, in succession, for maintaining a substantially even pressure across at least two layers of ultrasonic reactive coated material.

The plurality of substantially C-shaped support means collectively describe a first side, a second side opposite said first side, a substantially concave inside surface and a substantially convex outside surface opposite the concave inside surface. These substantially C-shaped support means are constructed of hardened, yet resilient steel.

The present ultrasonic anvil cartridge includes substantially elastomeric encapsulating means for encapsulating the plurality of substantially C-shaped support means, which may be composed of cured urethane. The elastomeric encapsulating means is operably positioned within the collective concave surface of the plurality of substantially C-shaped support means collectively to form a unitary cartridge having a substantially convex exterior surface. The substantially elastomeric encapsulating means also fills gaps and crevices which exist between adjacent ones of the successively aligned C-shaped support means to preclude vibration and friction between them.

The ultrasonic anvil cartridge may also include a grooved region formed within the substantially elastomeric encapsulating means opposite the upper most portion of the collective concave surface for maintaining said unitary cartridge in an aligned orientation relative to said anvil housing. Said grooved region operably accepts cartridge locating means emanating from the anvil housing at the collective first and second sides of the plurality of substantially C-shaped support means, for precluding rotation of the unitary cartridge positioned thereabout.

In the preferred embodiment of the invention, the substantially C-shaped support means comprise a plurality of "C" type snap rings which are commercially available and traditionally used for mechanical power transmission systems. These "C" type snap rings are preferably constructed of hardened steel having a resiliency of between 5/1000 of an inch and 10/1000 of an inch.

In an alternate embodiment of the invention, the substantially C-shaped support means comprises a continuous-wound spring encapsulated by substantially elastomeric encapsulating means, said continuous-wound spring including a journaled region so as to likewise form a substantially C-shaped support means.

BRIEF DESCRIPTION OF THE DRAWINGS

FIG. 1 of the drawings is a perspective view of a prior art ultrasonic sealing apparatus showing, in particular, the ultrasonic horn pinching the extended sleeve of a multi-wall paper valve bag in the sealing region of an ultrasonic anvil;

FIG. 2 of the drawings is a perspective view of the prior art ultrasonic anvil housing and cartridge of FIG. 1 showing, in particular, the orientation of approximately 200 "C" type snap rings;

FIG. 3 of the drawings is a fragmentary perspective view of the prior art showing, in particular, the juxtaposition of the approximately 200 separate "C" type snap rings;

FIG. 4 of the drawings is an elevated front view of the prior art device shown in FIGS. 1-3, taken along lines 4—4 and looking in the direction of the arrows, showing, in particular, the location of machining imperfections, gaps and spaces between the separate aligned "C" type snap rings;

FIG. 5 of the drawings in an elevated perspective view of applicants' present ultrasonic anvil cartridge showing, in particular, the interrelation of the substantially elastomeric encapsulating material and the substantially C-shaped support members;

FIG. 6 of the drawings is an elevated side, cross-sectional view taken along lines 6—6 and looking in the direction of the arrows showing, in particular, the grooved region within the substantially elastomeric encapsulating material, which can accept cartridge locating members from the anvil housing to preclude rotation of the cartridge; and FIG. 7 of the drawings is a partial cutaway front cross-sectional view of the ultrasonic anvil cartridge showing, in particular, the introduction of the elastomeric encapsulating material into the gaps and spaces between rings together with cartridge locating members engaging a number of substantially C-shaped support members.

DETAILED DESCRIPTION OF THE DRAWINGS

While this invention is a susceptible embodiment in many different forms, they are shown in the drawings and will herein be described in detail, several specific embodiments with the understanding that the present disclosure is to be considered as an exemplification of the principles of the invention and is not intended to limit the invention to the embodiments illustrated.

Portions of prior art ultrasonic sealing machines are shown in FIGS. 1 through 4 including ultrasonic horn 11, anvil housing 12, and plurality of individual C-rings 13, which includes C-ring 20, C-ring 21 and C-ring 22. Ultrasonic horn 11 is attached to an ultrasonic generating transducer (not shown). A hard non-resilient material is used in the construction of ultrasonic horn 11, which is shaped to deliver the desired frequency of ultrasonic energy to a long narrow area. Anvil 10 is comprised of anvil housing 12 which partially enshrouds a plurality of individual C-rings 13 which, for example, include C-rings 20, 21 and 22, which, in cooperation with anvil housing 12, define a resilient sealing region.

Extended sleeve 14 of a multi-wall valve bag is inserted between ultrasonic horn 11 and anvil 10 after the bag has been filled with a desired product. Extended sleeve 14 of a multi-wall valve bag has varying thicknesses, which result from their method of production. Proper sealing of extended sleeve 14 requires even, correct pressure across the entire portion of the sleeve to be sealed. Therefore, because ultrasonic horn 11 is non-resilient, the anvil should be resilient. As ultrasonic horn 11 approaches anvil housing 12, extended sleeve 14 is pinched against the plurality of individual C-rings 13, which are exposed through the aperture in anvil housing 12—to define a resilient sealing region which conforms to extended sleeve 14 such that there is even, correct pressure across extended sleeve 14, where it is compressed by ultrasonic horn 11.

Once extended sleeve 14 is pinched between ultrasonic horn 11 and the plurality of individual C-rings 13, ultrasonic horn 11 begins to vibrate, resulting in reactivation of the thermoplastic material coated on the inside of extended sleeve 14. Plurality of individual C-rings 13, also vibrate due to the vibration of ultrasonic horn 11. C-ring 20, C-ring 21 and C-ring 22, which are representative of the remaining C-rings contained in plurality of individual C-rings 13, rub against each other causing wear and tear in the side walls between C-ring 20 and C-ring 21 and between C-ring 21 and C-ring 22.

As most specifically shown in FIG. 4, C-ring 20, C-ring 21 and C-ring 22 will often contain gaps, spaces and crevices between various regions of the rings, which are expanded by the constant friction between rings due to their vibration by ultrasonic horn 11. The end result is the loosening of the plurality of individual C-rings 13 within anvil housing 12, thus necessitating frequent replacement.

Replacement involves opening anvil housing 12, removing each C-ring in plurality of individual C-rings 13 and then loading new C-rings into anvil housing 12 to form a new plurality of individual C-rings 13. Anvil housing 12 is then sealed closed, thus loading C-ring 20 against C-ring 21 and C-ring 21 against C-ring 22, and so on and so forth, such that the entire plurality of individual C-rings 20 are forced together.

Ultrasonic anvil cartridge 100 is shown in FIGS. 5 through 7 of the drawings as comprising substantially C-shaped support means 101 and substantially elastomeric encapsulating means 102. The plurality of substantially C-shaped support means 101 describe a collective first side 103, a collective second side 104, a substantially concave inside surface 105 and a substantially convex outside surface 106. In operation, substantially convex outside surface 106 is pressed up against the upper portion of anvil housing 12 so as to be exposed through its aperture—thus defining a resilient sealing region which is presented to extended sleeve 14 and indirectly to ultrasonic horn 11. Substantially convex outside surface 106 is collectively described by a plurality of substantially C-shaped support means 101. Each substantially C-shaped support means 101 is resilient and capable of independent movement, such that they can be individually vertically displaced, even though they are successively aligned. This arrangement maintains a substantially even pressure across extended sleeve 14 for ultrasonic horn 11 allowing reactivation the ultrasonic reactive material in a uniform manner.

Substantially concave inside surface 105 is bonded to substantially elastomeric encapsulating means 102 to form a unitary cartridge comprising substantially C-shaped support means 101 and substantially elastomeric encapsulating means 102. Substantially elastomeric encapsulating means 102 is applied as a liquid to substantially concave inside 105 which is formed by a plurality of substantially C-shaped support means 101. Substantially elastomeric encapsulating means 102 not only fills the interior region, but also fills gaps and crevices 107 which are often formed during the original machining of substantially C-shaped support means 101. The adhesion of substantially elastomeric encapsulating means 102 to substantially concave inside 105 forms unitary cartridge 110.

The use of unitary cartridge 100 significantly simplifies maintenance by requiring the removal and replacement of only one piece from anvil housing 12 rather than removing each of the plurality of substantially C-shaped support means 101 individually. Furthermore, the introduction of substantially elastomeric encapsulating means 102 into gaps and crevices 107—formed by the juxtaposition of two or more substantially C-shaped support means 101—serves to reduce friction between substantially C-shaped support means 101, thus prolonging wear and is believed to improve the efficient delivery of energy to extended sleeve 14.

Anvil housing 12 may also include cartridge locating members 108 shown in FIG. 7 of the drawings. Cartridge locating members 108 are operably connected to anvil housing 12 and engage a portion of substantially elastomeric encapsulating means 102. Cartridge locating members 108 extend axially into the anvil housing from both collective first side 103 and collective second side 104 engaging only a small number of substantially C-shaped support means 101 through elastomeric encapsulating means 102 to preclude rotation.

In a preferred embodiment of the invention, substantially elastomeric encapsulating means 102 is comprised of urethane which is applied in liquid form and later cured. One such urethane material that has been found effective as FLEXANE 80 from Devcon Co. It may also be desirable to first apply a coating of urethane primer to substantially C-shaped support means 101 prior to the application of the liquid urethane to ensure bonding of the urethane to substantially C-shaped support means 101. One such primer is DEVCON PRIMER FL-10. Inventors also contemplate the use of other substantially elastomeric material for the encapsulation of substantially C-shaped support means 101.

Substantially C-shaped support means 101, in the preferred embodiment, are comprised of commercially available "C" type snap rings, which are used in mechanical power transmission systems. It is further contemplated that substantially C-shaped support means 101 be constructed of hardened steel having a resiliency of between 5/1000 inch and 10/1000 of an inch.

In another potential embodiment of the invention, substantially C-shaped support means 101 are constructed of a continuous-wound spring, which is substantially compressed together such that the individual loops of the continous-wound spring are in substantial contact with one another. Substantially elastomeric encapsulating means 102 is positioned in the interior region formed by the compression of the continous-wound spring. Once substantially elastomeric encapsulating means 102 has hardened, the continous-wound spring may be journaled so as to form substantially C-shaped support means 101. Other hard, yet resilient substantially C-shaped members may likewise be utilized.

The foregoing description and drawings merely explain and illustrate the invention and the invention is not limited thereto except insofar as the appended claims ar so limited and as those skilled in the art who have the disclosure before them will be able to make modifications an variations therein without departing from the scope of the invention.

What is claimed is:

1. An ultrasonic anvil cartridge for use in association with ultrasonic apparatuses for sealing at least two layers of ultrasonic reactive material, of the type having an anvil housing; said ultrasonic anvil cartridge cooperating with said anvil housing towards maintaining a substantially even pressure across said at least two layers of ultrasonic reactive coated material as said ultrasonic anvil cartridge and said anvil housing define a sealing region which is operably positioned relative to an ultrasonic wave generator, such that said at least two layers of ultrasonic reactive material are substantially compressed together between said ultrasonic wave generator and said ultrasonic anvil cartridge, said ultrasonic anvil cartridge comprising:

a plurality of substantially C-shaped support means for maintaining said substantially even pressure across said at least two layers of ultrasonic reactive coated material, said plurality of substantially C-shaped support means constructed of hardened, resilient steel;

said plurality of substantially C-shaped support means collectively describing a first side, a second side opposite said first side, a substantially concave inside surface and a substantially convex outside surface opposite said concave inside surface;

said plurality of substantially C-shaped support means being operably aligned so as to be positioned adjacent another in respective succession, substantially elastomeric encapsulating means for encapsulating said plurality of substantially C-shaped support means operably positioned within the collective concave surface of said plurality of substantially C-shaped support means collectively to form a unitary cartridge having a substantially convex exterior surface;

said substantially elastomeric encapsulating means further filling gaps and crevices between adjacent ones of said substantially C-shaped support means to reduce vibration and friction between same.

2. The invention according to claim 1 wherein said substantially elastomeric encapsulating means includes a grooved region opposite the upper most portion of said collective concave surface for maintaining said unitary cartridge in an aligned orientation relative to said anvil housing.

3. The invention according to claim 2 wherein said anvil housing further comprises cartridge locating means emanating inwardly from said anvil housing at said collective first and second sides for precluding rotation of said unitary cartridge positioned thereabout.

4. The invention according to claim 1 wherein said plurality of substantially C-shaped support means comprises a plurality of "C" type snap rings.

5. The invention according to claim 4 wherein said plurality of "C" type snap rings are constructed of hardened steel having a resiliency of between 5/1000 inch and 10/1000 inch.

6. The invention according to claim 1 wherein said plurality of substantially C-shaped support means comprises a continuous-wound spring encapsulated by said substantially elastomeric encapsulating means, said continuous-wound spring including a journaled region so as to form a substantially C-shaped support means.

7. The invention according to claim 6 wherein said continuous-wound spring is constructed of hardened steel having a resiliency between of 5/1000 inch and 10/1000 inch.

8. The invention according to claim 1 wherein said substantially elastomeric encapsulating means comprises cured urethane.

* * * * *